(12) United States Patent
Ulrey et al.

(10) Patent No.: US 9,309,836 B2
(45) Date of Patent: Apr. 12, 2016

(54) METHODS AND SYSTEMS FOR BOOST CONTROL

(71) Applicant: Ford Global Technologies, LLC, Dearborn, MI (US)

(72) Inventors: Joseph Norman Ulrey, Dearborn, MI (US); Julia Helen Buckland, Commerce Township, MI (US); Gregory Patrick McConville, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 337 days.

(21) Appl. No.: 13/965,901

(22) Filed: Aug. 13, 2013

(65) Prior Publication Data

US 2015/0047341 A1 Feb. 19, 2015

(51) Int. Cl.
*F02B 33/44* (2006.01)
*F02M 25/07* (2006.01)
*F02B 29/04* (2006.01)
*F02B 37/16* (2006.01)

(52) U.S. Cl.
CPC ............. *F02M 25/07* (2013.01); *F02B 29/04* (2013.01); *F02B 29/0493* (2013.01); *F02B 37/16* (2013.01); *F02M 25/0709* (2013.01)

(58) Field of Classification Search
CPC ...... F02B 37/16; F02B 37/127; F02B 37/162; F02B 37/18; F02B 37/183; F02B 37/186; F02D 41/0007; F02D 23/00; F02M 25/0709; F02M 25/0719; F02M 25/072; F02M 25/0726; Y02T 10/144

USPC ............... 60/611, 605.1, 605.2; 701/108
See application file for complete search history.

(56) References Cited

U.S. PATENT DOCUMENTS

| 3,614,259 | A | 10/1971 | Neff |
| 4,351,154 | A | 9/1982 | Richter |
| 4,389,845 | A | 6/1983 | Koike |
| 4,443,153 | A | 4/1984 | Dibelius |
| 4,544,326 | A | 10/1985 | Nishiguchi et al. |
| 4,949,276 | A | 8/1990 | Staroselsky et al. |
| 6,079,210 | A | 6/2000 | Pintauro et al. |

(Continued)

FOREIGN PATENT DOCUMENTS

| EP | 0435357 A1 | 7/1991 |
| EP | 2317111 A1 | 5/2001 |

(Continued)

OTHER PUBLICATIONS

McConville, Gregory Patrick et al., "Methods and Systems for Boost Control," U.S. Appl. No. 13/965,938, filed Aug. 13, 2013, 40 pages.

(Continued)

*Primary Examiner* — Thai Ba Trieu
(74) *Attorney, Agent, or Firm* — Julia Voutyras; Alleman Hall McCoy Russell & Tuttle LLP

(57) ABSTRACT

Methods and systems are provided for varying a proportion of compressed air recirculated to a compressor inlet from a location downstream of the compressor and upstream of a charge air cooler and a location downstream of the charge air cooler. A temperature-controlled compressor recirculation flow is used to reduce condensation from EGR being ingested into the compressor. The temperature-controlled compressor recirculation flow is also used to address compressor surge.

19 Claims, 9 Drawing Sheets

(56) References Cited

U.S. PATENT DOCUMENTS

| | | | |
|---|---|---|---|
| 6,408,833 | B1 | 6/2002 | Faletti |
| 6,565,479 | B2 | 5/2003 | Fattic et al. |
| 6,681,171 | B2 | 1/2004 | Rimnac et al. |
| 6,725,847 | B2 | 4/2004 | Brunemann et al. |
| 6,813,887 | B2 * | 11/2004 | Sumser et al. .......... 60/611 |
| 6,983,596 | B2 | 1/2006 | Frankenstein et al. |
| 7,021,058 | B2 * | 4/2006 | Scheinert ............. 60/611 |
| 7,137,253 | B2 | 11/2006 | Furman et al. |
| 7,163,005 | B2 | 1/2007 | Tussing et al. |
| 7,254,948 | B2 * | 8/2007 | Gustafson et al. .......... 60/611 |
| 7,640,744 | B2 | 1/2010 | Rollinger et al. |
| 7,793,500 | B2 * | 9/2010 | Igarashi ............... 60/611 |
| 7,814,752 | B2 * | 10/2010 | Hu ..................... 60/611 |
| 8,161,746 | B2 | 4/2012 | Ulrey et al. |
| 8,267,069 | B2 | 9/2012 | Hsia et al. |
| 8,286,616 | B2 | 10/2012 | Clarke et al. |
| 8,287,233 | B2 | 10/2012 | Chen |
| 8,333,071 | B2 | 12/2012 | Oakley et al. |
| 8,375,714 | B2 * | 2/2013 | Gokhale et al. .......... 60/611 |
| 2006/0196182 | A1 | 9/2006 | Kimoto et al. |
| 2008/0163855 | A1 | 7/2008 | Matthews et al. |
| 2009/0071150 | A1 | 3/2009 | Joergl et al. |
| 2011/0023842 | A1 | 2/2011 | Kurtz |
| 2011/0094480 | A1 | 4/2011 | Suhocki et al. |
| 2012/0014812 | A1 | 1/2012 | Blaiklock et al. |
| 2012/0297765 | A1 | 11/2012 | Vigild et al. |
| 2014/0026588 | A1 * | 1/2014 | Velez ................. 60/782 |
| 2014/0202435 | A1 * | 7/2014 | Hilditch et al. ........ 123/568.21 |

FOREIGN PATENT DOCUMENTS

| | | | |
|---|---|---|---|
| EP | 1124047 | A1 | 8/2001 |
| EP | 2426340 | A1 | 3/2012 |
| EP | 2562397 | A1 | 8/2012 |

OTHER PUBLICATIONS

Ulrey, Joseph Norman et al., "Methods and Systems for Condensation Control," U.S. Appl. No. 13/965,751, filed Aug. 13, 2013, 36 pages.

Styles, Daniel Joseph et al., "Methods and Systems for Boost Control," U.S. Appl. No. 13/965,698, filed Aug. 13, 2013, 43 pages.

Ulrey, Joseph Norman et al., "Methods and Systems for Boost Control," U.S. Appl. No. 13/965,952, filed Aug. 13, 2013, 40 pages.

Jankovic, Mrdjan J. et al., "Methods and Systems for Boost Control," U.S. Appl. No. 13/829,648, filed Mar. 14, 2013, 39 pages.

Banker, Adam Nathan et al., "Methods and Systems for Torque Control," U.S. Appl. No. 13/965,917, filed Aug. 13, 2013, 46 pages.

Buckland Julia Helen et al., "Methods and Systems for Surge Control," U.S. Appl. No. 113/965,725, filed Aug. 13, 2013, 38 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/965,794, filed Aug. 13, 2013, 56 pages.

McConville, Gregory Patrick et al., "Methods and Systems for Boost Control," U.S. Appl. No. 13/965,963, filed Aug. 13, 2013, 45 pages.

Ulrey, Joseph Norman et al., "Methods and Systems for EGR Control," U.S. Appl. No. 13/966,006, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Method and System for Fuel Vapor Management," U.S. Appl. No. 13/660,884, filed Oct. 25, 2012, 38 pages.

\* cited by examiner

METHODS AND SYSTEMS FOR BOOST CONTROL

FIELD

The present application relates to methods and systems for using compressor recirculation flow to improve boost control.

BACKGROUND AND SUMMARY

Engine systems may be configured with a boosting device, such as a turbocharger, for providing a boosted aircharge and improving peak power outputs. Therein a turbine is rotated using energy from an exhaust flow, the turbine then driving a compressor which delivers a boosted aircharge to the engine intake. In an effort to meet stringent federal government fuel economy standards, engine systems may also be configured with exhaust gas recirculation (EGR) systems wherein at least a portion of the exhaust gas is recirculated to the engine intake. For example, the EGR system may be a low-pressure EGR system (LP-EGR) that recirculates exhaust gas from downstream of an exhaust turbine to upstream of an intake compressor. EGR benefits include an increase in engine dilution and improvements in fuel economy.

However, since EGR has a relatively large water content, the addition of LP-EGR to the intake at a pre-compressor location increases the risk of condensation at both a compressor inlet as well as a charge air cooler outlet. Specifically, under cold ambient conditions, when the humid EGR is mixed with cold ambient air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events.

To address these issues, engine control systems may employ various approaches to limit the condensation. One example approach is shown by Joergl et al. in US publication 2009/0071150. Therein, a mixing pipe is located inside an intake tube for receiving EGR. To reduce damage to the compressor wheel, fresh air is mixed with EGR inside the mixing pipe before the mixture is delivered onto the compressor wheel in an area of low circumferential speed. Another example approach is shown by Clarke et al in U.S. Pat. No. 8,286,616. Therein, an amount of exhaust recirculated via an LP-EGR system and an EGR passage coupled between the exhaust manifold and the intake manifold is adjusted responsive to the humidity in the combustion chamber so as bring the estimated humidity to a desired range.

However, the inventors herein have identified issues with such approaches. For example, the approach of '150 requires an additional mixing pipe which can add component cost and complexity. As another example, condensation may occur at a compressor even when EGR is adjusted based on combustion chamber humidity due to variations in ambient humidity and ambient temperature causing fluctuation in conditions at the compressor inlet. As a result, even with the above mentioned mixing approaches, condensation can occur, leading to compressor degradation.

In one example, some of the above issues may be addressed by a method for a boosted engine comprising adjusting a relative amount of compressed air recirculated to upstream of a compressor from a first passage downstream of the compressor and downstream of an intercooler, and from a second passage downstream of the compressor and upstream of the intercooler based on compressor inlet temperature. The adjusting may be further based on EGR. In this way, a temperature and humidity controlled mixture of compressor recirculation flow and EGR can be delivered to the engine to provide engine dilution while reducing the risk of condensation.

As an example, a boosted engine system may include a turbocharger having a compressor driven by a turbine, and a charge air cooler coupled downstream of the compressor for cooling boosted air before delivery to an engine intake. At least a first recirculation passage may be provided for recirculating cooler boosted air from downstream of the charge air cooler to a location upstream of the compressor inlet. Additionally, a second recirculation passage may be provided for recirculating warmer boosted air from upstream of the charge air cooler to the location upstream of the compressor inlet. In one example, each recirculation passage may have a dedicated valve. Alternatively, the two recirculation passages may merge at a position upstream of the compressor inlet, and a common recirculation valve may be used. The recirculation valve(s) may be a continuously variable valve whose position is adjustable to any position from a fully open position to a fully closed position.

During conditions when low pressure EGR is requested, an engine controller may adjust the opening of the valve(s) to provide a temperature-controlled mixture upstream of the compressor inlet. A proportion of cooled compressed air recirculated from a post-cooler location relative to a proportion of warm compressed air recirculated from a pre-cooler location may be adjusted to maintain the compressor inlet above a threshold temperature, below which condensation at the compressor is likely. For example, in response to an increase in ambient humidity, and/or an increase in the water content in the EGR, the proportion of warm compressor recirculation flow is increased (and the proportion of cold compressor recirculation flow is decreased). The temperature-controlled compressor recirculation flow is then mixed with the low pressure EGR upstream of the compressor and the mixture is delivered to the compressor inlet. The opening of the valve may be adjusted based on a difference between an estimated compressor inlet temperature and a desired compressor inlet temperature such that proportion of warm compressor recirculation flow is increased as the estimated compressor inlet temperature falls below the desired compressor inlet temperature. In alternate examples, such as when ambient temperature is higher, the valve opening may be adjusted to decrease the proportion of warm compressor recirculation flow and increase the proportion of cold compressor recirculation flow.

In this way, by recirculating warmer boosted air from upstream of a charge air cooler to a compressor inlet when condensation is possible, a temperature-controlled mixture may be provided at the compressor inlet using existing engine hardware. By warming the compressor inlet using the compressor recirculation flow, condensation at the compressor inlet is reduced even as ambient conditions or EGR conditions fluctuate. By reducing the amount of EGR condensation ingested at a compressor, condensation related combustion issues may be reduced. For example, misfires may be reduced. In addition, degradation of compressor components due to impingement of condensate on the compressor blades at high rotation speeds is reduced. Overall, the performance and life of the compressor is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
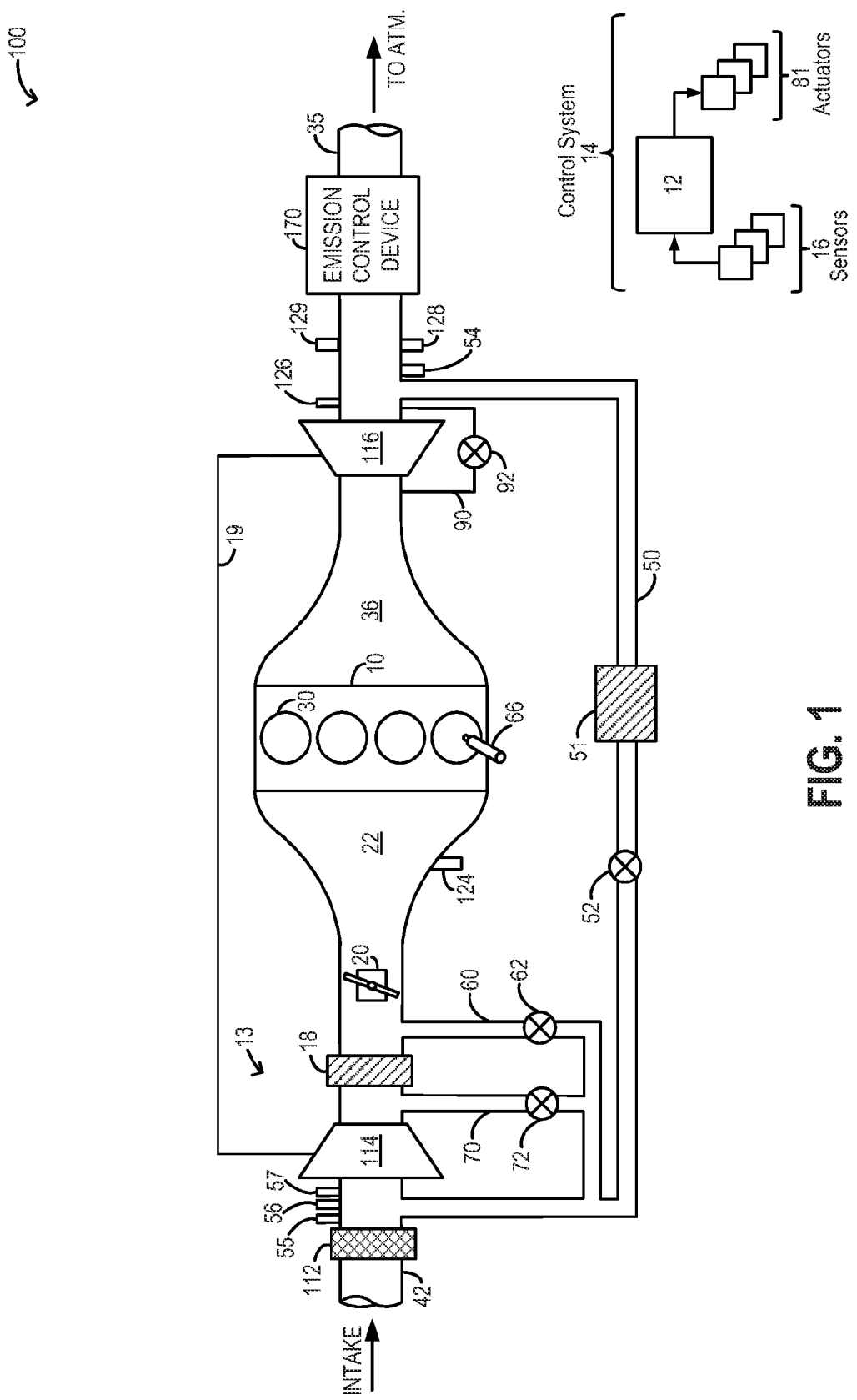
FIGS. 1-2 and 8 show example embodiments of a boosted engine system.
Figure 2:
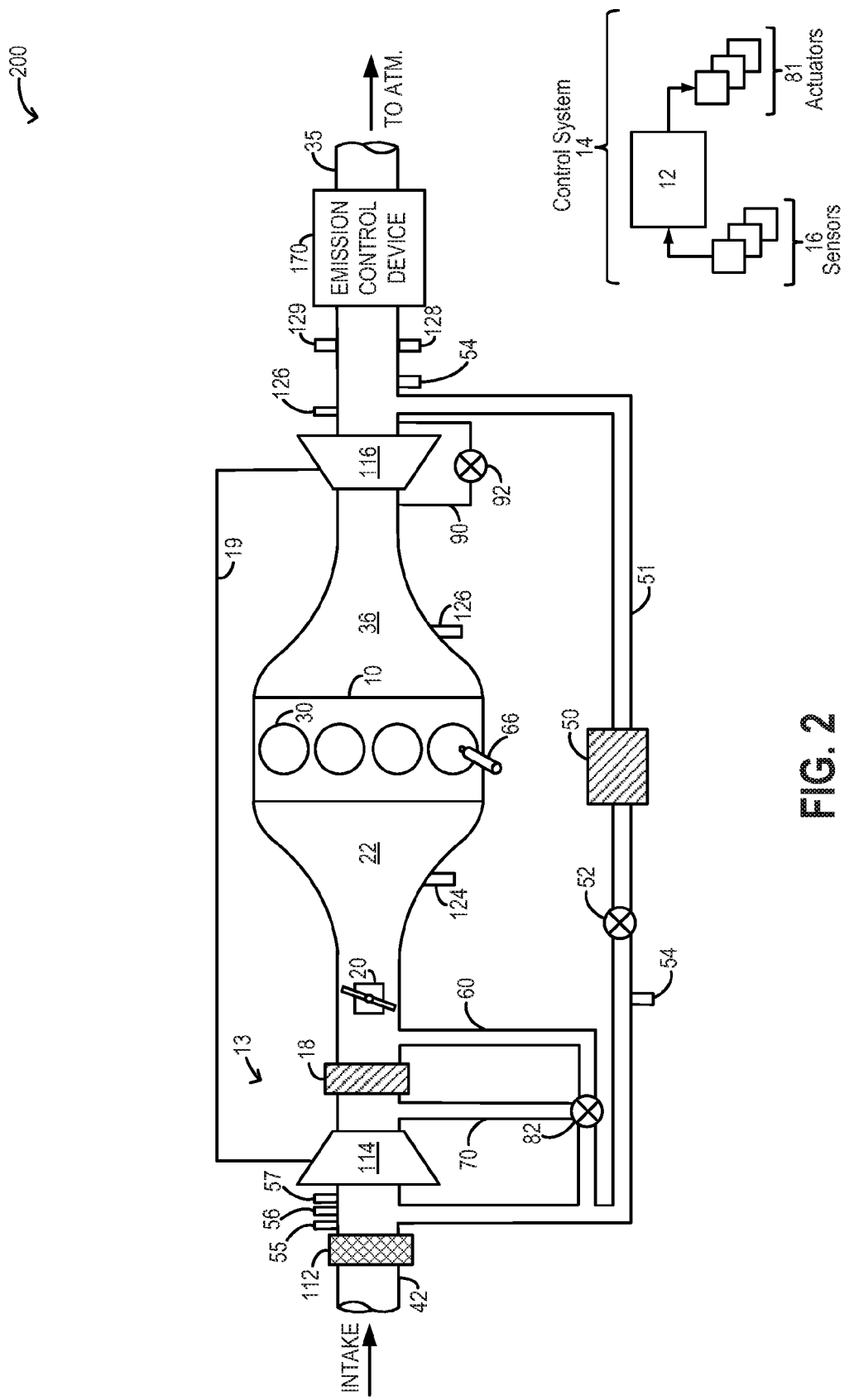
Figure 7:
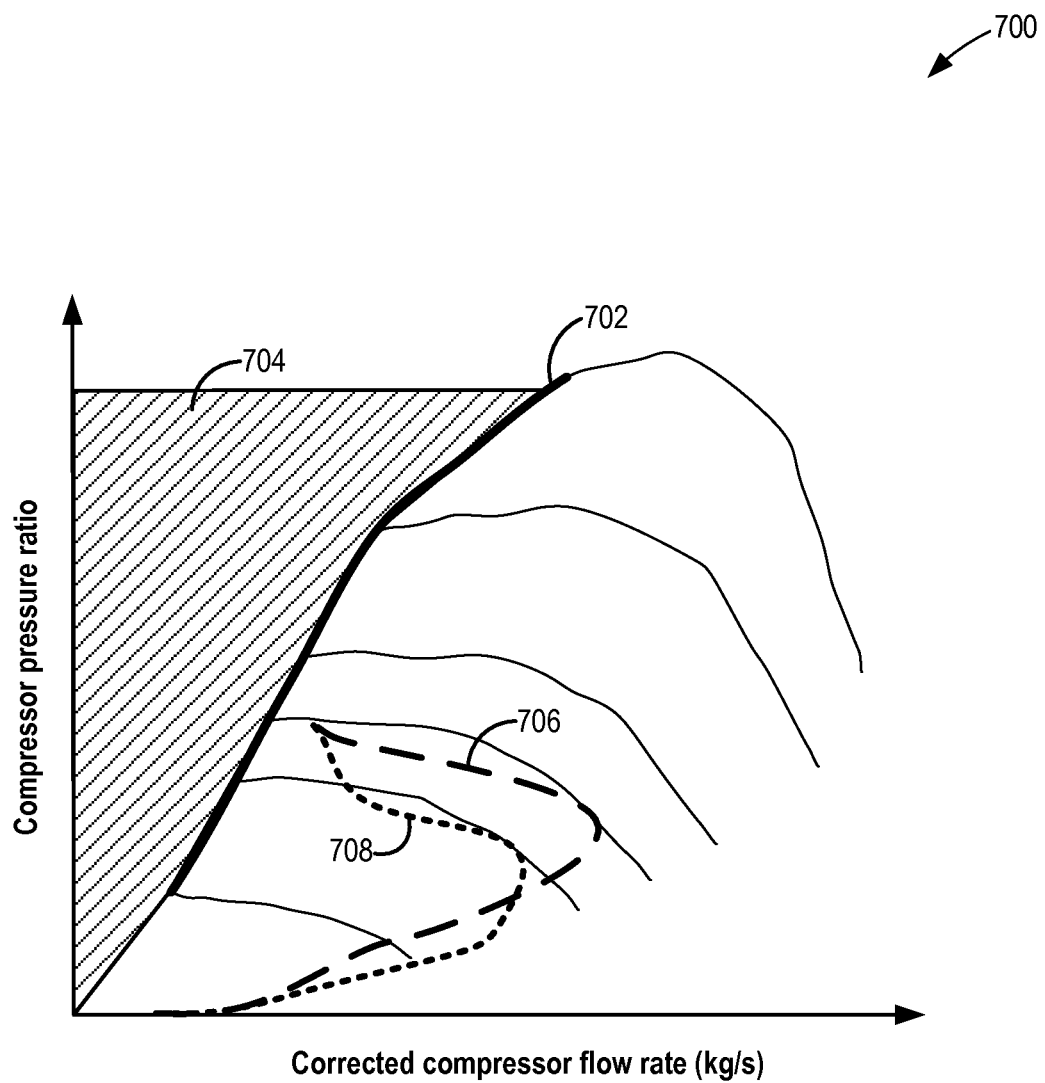
FIG. 7 shows a compressor map depicting a surge limit of the compressor, and the effect of opening a valve of the first or second passage on a margin to the surge limit.
Figure 8:
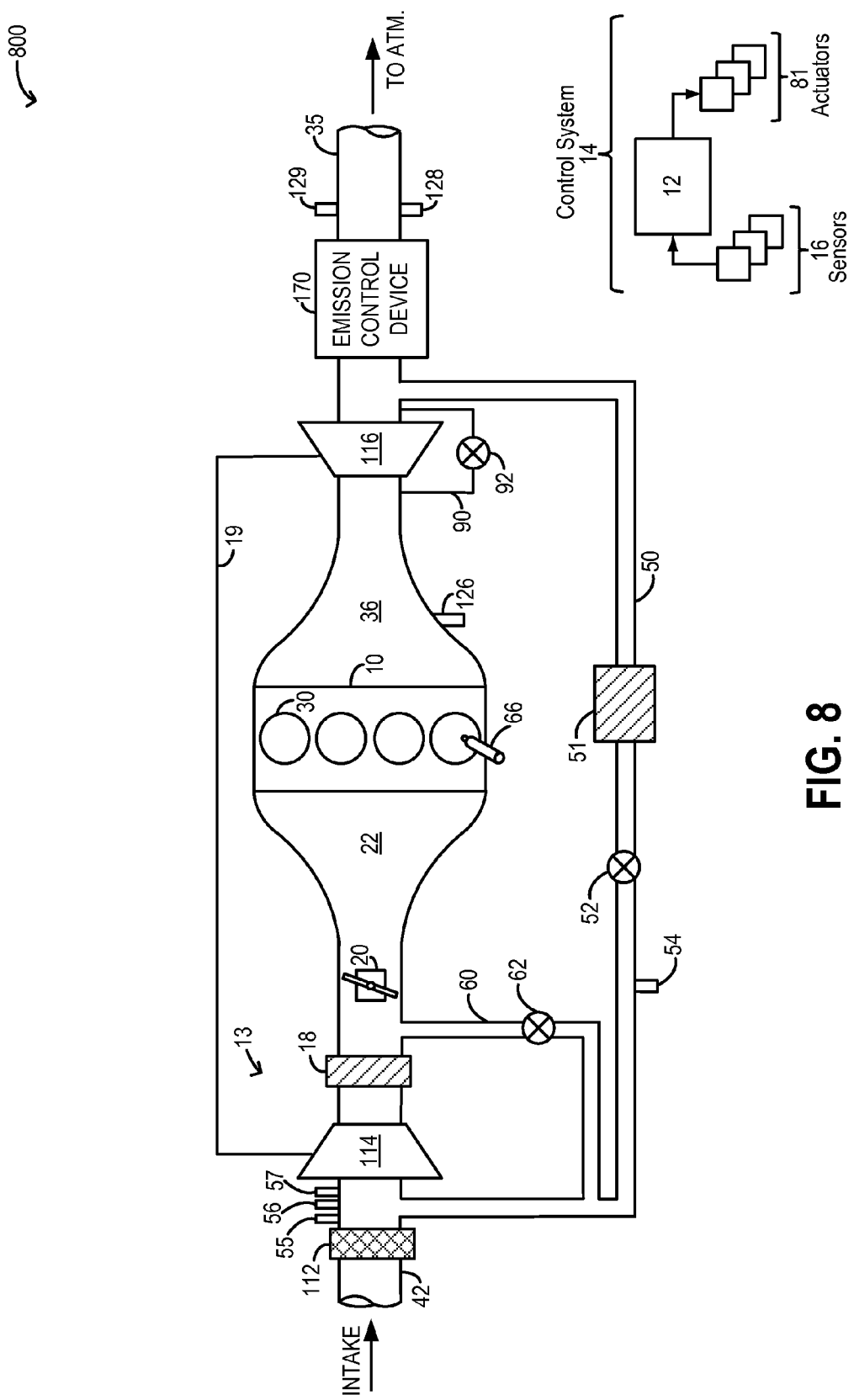
Figure 9:
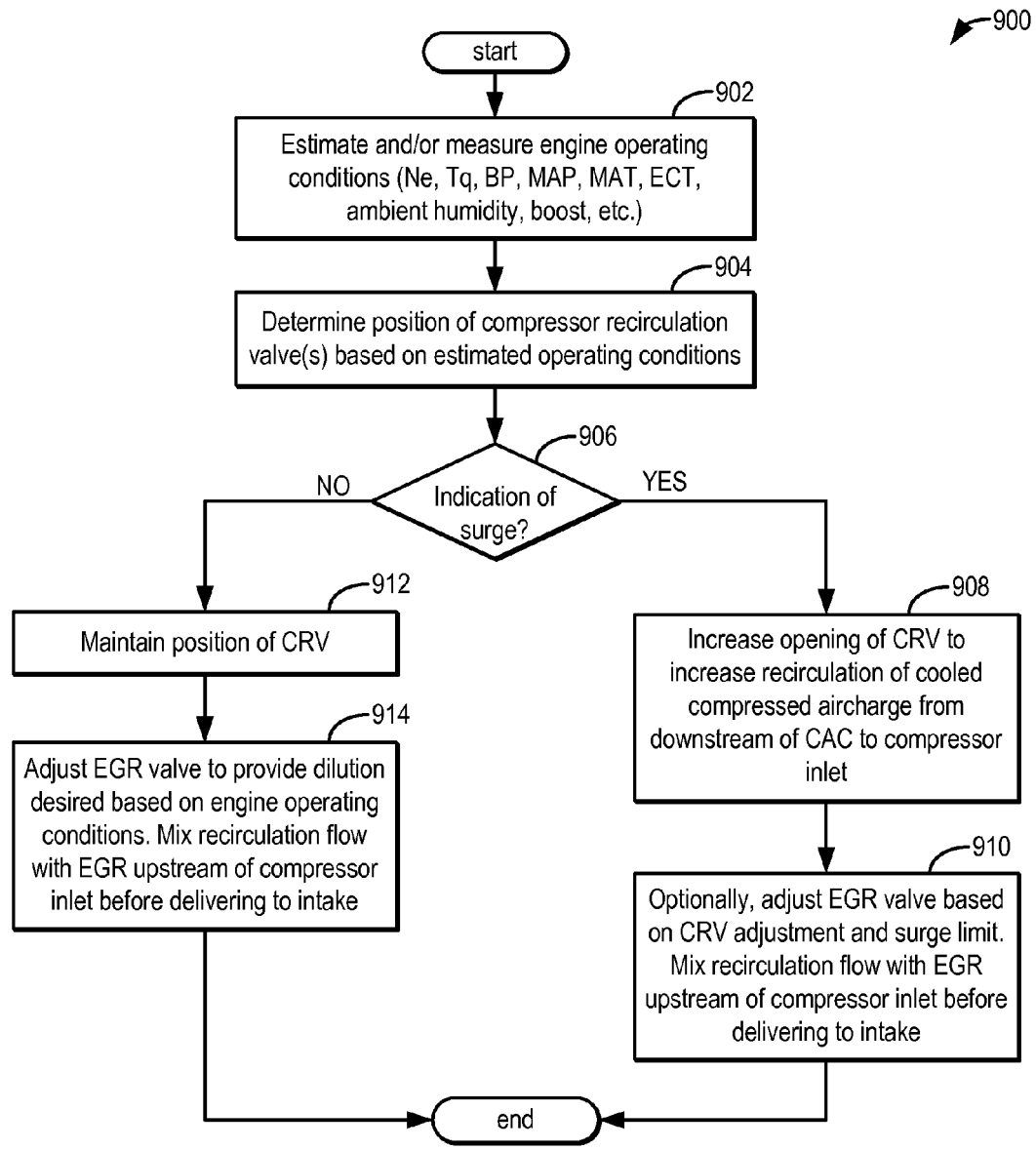
FIG. 9 shows a high level flow chart of a method of addressing compressor surge by increasing recirculation of cooled compressed air from downstream of a charge air cooler.

The following description relates to systems and methods for adjusting a proportion of compressed aircharge recirculated to a compressor inlet in a boosted engine system, such as the system of FIGS. 1-2 and 8, from upstream and/or downstream of a charge air cooler. A controller may be configured to perform a control routine, such as the routine of FIG. 3, to adjust the amount of cooler compressed aircharge recirculated from downstream of the charge air cooler relative to the amount of warmer compressed aircharge recirculated from upstream of the charge air cooler based on surge and condensation considerations. Therein, the controller may adjust the amounts based on a compressor inlet temperature and further based on EGR so that a temperature of an aircharge entering the compressor is maintained above a threshold where condensation can occur. The controller may also adjust the amounts based on an indication of compressor surge to cool the compressor inlet temperature, thereby reducing a temperature amplification effect (FIG. 7). In some embodiments, the controller may address compressor surge using cooled compressor recirculation flow only, as shown at FIG. 9 to reduce thermal amplification effects. As elaborated at FIG. 4, the controller may select between using increased recirculation of warm compressed aircharge or increased recirculation of cool compressed aircharge to reduce surge based on condensation considerations. Example adjustments are described with reference to FIGS. 5-6. By reducing condensation received in the compressor from EGR, misfires and compressor degradation associated with the condensation can be reduced. By addressing surge using increased recirculation of cooled compressor aircharge, mass flow through the compressor is increased while reducing temperature amplification. Overall, boosted engine performance is improved.

FIG. 1 schematically shows aspects of an example engine system 100 including an engine 10. In the depicted embodiment, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

One or more sensors may be coupled to an inlet of compressor 114. For example, a temperature sensor 55 may be coupled to the inlet for estimating a compressor inlet temperature. As another example, a humidity sensor 57 may be coupled to the inlet for estimating a humidity of aircharge entering the compressor. Still other sensors may include, for example, air-fuel ratio sensors, pressure sensors, etc. In other examples, one or more of the compressor inlet conditions (such as humidity, temperature, etc.) may be inferred based on engine operating conditions.

During selected conditions, such as during a tip-out, when going from engine operation with boost to engine operation without boost, compressor surge can occur. This is due to a decreased flow through the compressor when the throttle closes at the tip-out. The reduced forward flow through the compressor can cause surge and degrade turbocharger performance. In addition, surge can lead to NVH issues such as undesirable noise from the engine intake system. To reduce compressor surge, at least a portion of the aircharge compressed by compressor 114 may be recirculated to the compressor inlet. This allows excess boost pressure to be substantially immediately relieved. The compressor recirculation system may include a first recirculation passage 60 for recirculating compressed air from the compressor outlet, downstream of charge-air cooler 18 to the compressor inlet. The compressor recirculation system may further include a second recirculation passage 70 for recirculating compressed air from the compressor outlet, upstream of charge-air cooler 18 to the compressor inlet. As such, the compressor recirculation flow delivered to the compressor inlet along the second passage (from upstream of CAC 18) may be a warmer recirculation flow (e.g., at a higher temperature) while the recirculation flow delivered to the compressor inlet along the first passage (from downstream of CAC 18) may be a cooler recirculation flow (e.g., at a lower temperature).

One or more valves may be coupled to the recirculation passages to control an amount of flow recirculated to the compressor inlet. In one example embodiment, depicted at FIG. 1, the first passage may include a first valve 62 for adjusting an amount of cooler recirculation flow recirculated to the compressor inlet while the second passage may include a second valve 72 for adjusting an amount of warmer recirculation flow recirculated to the compressor inlet. In an alternate embodiment 200, as depicted at FIG. 2, flow through the first and second passages may be controlled by a common valve 82. Common valve 82 may be an on-off type single variable valve for controlling flow along the first and second passages. Alternatively, common valve 82 may be a thermostat-controlled proportioning valve that is configured to adjust an amount of flow received at the compressor inlet from the first and second passages to provide a temperature-controlled recirculation flow mixture at the compressor inlet, as discussed in further detail below.

One or both of valves 62 and 72 may be continuously variable valves wherein a position of the valve is continuously variable from a fully closed position to a fully open position. Likewise, in embodiments where compressor recirculation flow is controlled via a common valve 82, the valve may be a continuously variable valve. Alternatively, one or more of the valves may be an on-off valve. In some embodiments, one or more of the valves may be normally partially open during boosted engine operation to provide some surge margin. Herein, the partially open position may be default valve position. Then, in response to the indication of surge, the opening of one or more of the valves may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, one or both of the first and second valves may be held closed during boosted engine operation (e.g., peak performance conditions) to improve boost response and peak performance. The valves may then be opened (e.g., partially opened or fully opened) in response to an indication of surge, as discussed below.

Since the recirculation flow received along the second passage from a pre-cooler location is warmer than the recirculation flow received along the first passage from the post-compressor location, the flow along the second passage may herein be referred to as a hot recirculation flow, and the second valve may be referred to as the hot compressor recirculation flow valve. Likewise, the flow along the first passage may herein be referred to as a cold recirculation flow, and the first valve may be referred to as the cold compressor recirculation flow valve. By adjusting the valve(s) to adjust an amount of flow received at the compressor inlet from each of the first and second passages, a temperature-controlled recirculation flow may be provided at the compressor inlet. In addition, since low pressure EGR may also be received at the compressor inlet and mixed with the recirculation flow before being delivered to the compressor, the amount and temperature of compressor recirculation flow may be mixed with and adjusted based on EGR to provide a temperature-controlled mixture at the compressor inlet. This reduces the likelihood of condensation at the compressor.

Figure 3:
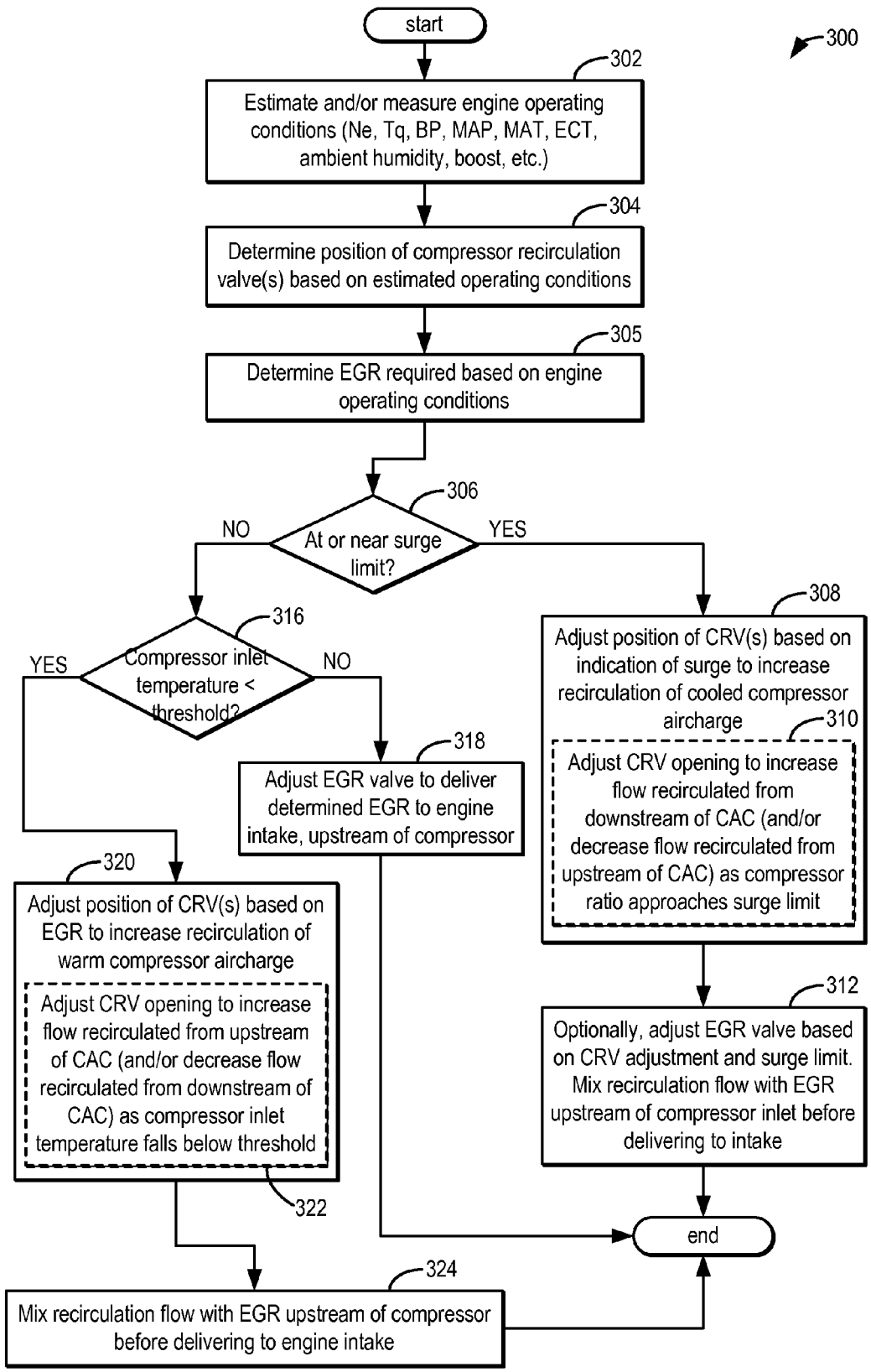
FIG. 3 shows a high level flow chart illustrating a routine that may be implemented for adjusting a ratio of compressor flow recirculated from upstream and downstream of an intercooler to reduce condensation at the compressor and/or address compressor surge.
Figure 4:
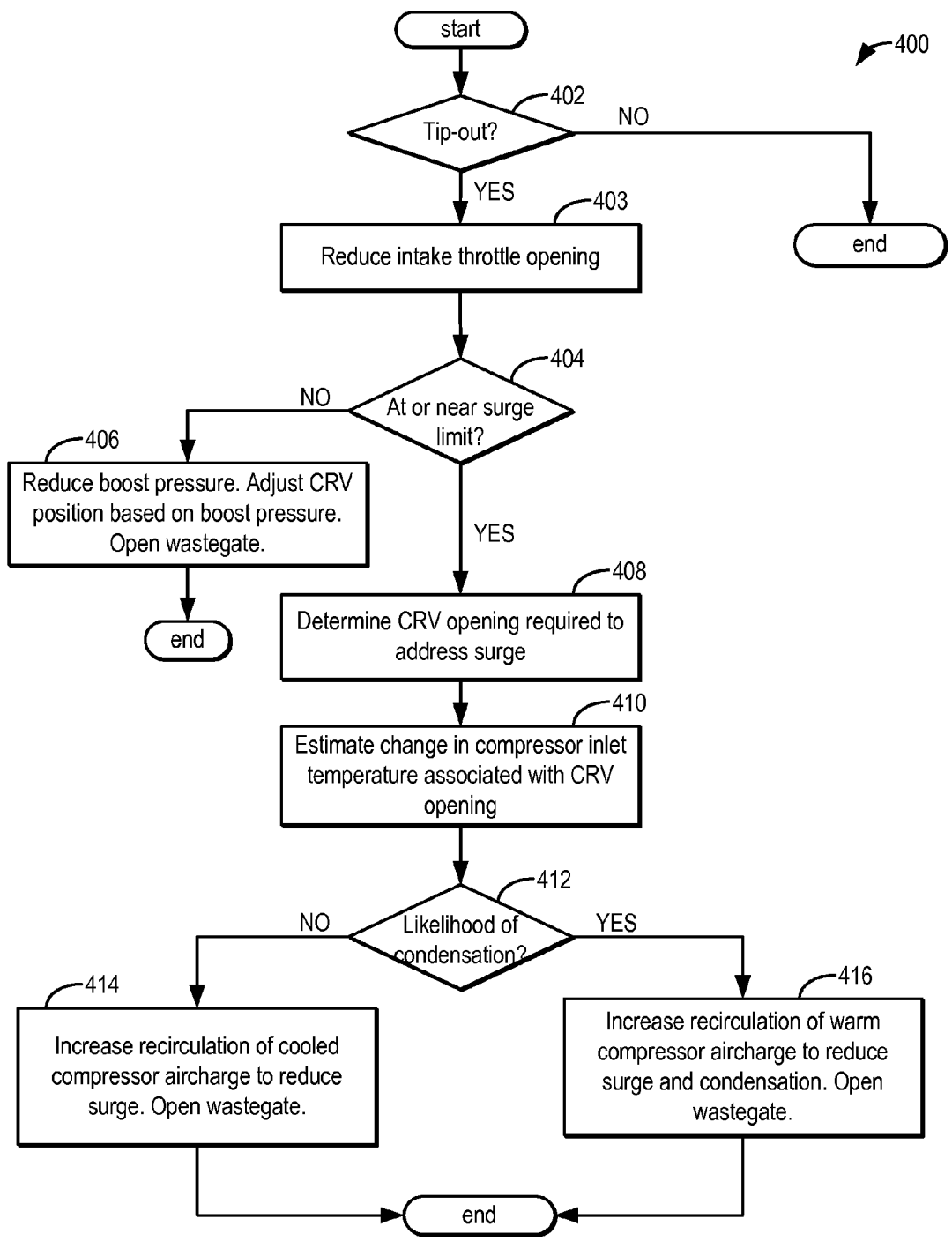
FIG. 4 shows a high level flow chart illustrating a routine that may be implemented for adjusting compressor flow recirculated from upstream and downstream of an intercooler in response to an indication of surge based on condensation considerations.

As elaborated herein with reference to FIGS. 3-4, a controller may adjust the proportions of pre-cooler and post-cooler compressed air recirculated to the compressor inlet responsive to operating conditions such as an indication of surge and/or a likelihood of condensation at the compressor. For example, during a first condition, the controller may only open valve 72 and recirculate warmer pre-cooler compressed air to the compressor inlet to reduce surge. In another example, during a second condition, the controller may only open valve 62 and recirculate colder post-cooler compressed air to the compressor inlet to reduce surge. Further still, the controller may adjust an opening of each of valves 62 and 72, to adjust a relative amount of compressed air recirculated to the compressor inlet from each of the first and second passages provide a more temperature-controlled compressed air-charge mixture to the compressor inlet. In one example, as elaborated below, the controller may select between relieving surge by opening the first valve, the second valve, or both valves based on a likelihood of condensation at the compressor inlet.

One or more sensors may be coupled to intake passage 42, upstream of compressor 114, for determining a composition and condition of aircharge entering the compressor. These sensors may include, for example, a compressor inlet temperature sensor 55, a compressor inlet pressure (CIP) sensor 56, as well as a compressor inlet humidity sensor 57. The sensors may estimate a condition of the intake air received at the compressor inlet from the intake passage as well as the aircharge recirculated from upstream or downstream of the CAC. In addition, when EGR is enabled, the sensors may estimate a temperature, pressure, humidity, and air-fuel ratio of the aircharge mixture including fresh air, recirculated compressed air, and exhaust residuals received at the compressor inlet.

During a tip out wastegate actuator 92 may be actuated open to dump at least some exhaust pressure from upstream of the turbine to a location downstream of the turbine via wastegate 90. By reducing exhaust pressure upstream of the turbine, turbine speed can be reduced.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to EGR passage 50, through EGR cooler 51 and EGR valve 52, to the inlet of compressor 114. The EGR valve may be opened to admit a controlled amount of cooled exhaust gas to the compressor inlet for desirable combustion and emissions-control performance. In this way, engine system 10 is adapted to provide external, low-pressure (LP) EGR by tapping exhaust gas from downstream of turbine 116. The rotation of the compressor, in addition to the relatively long LP-EGR flow path in engine system 10, provides excellent homogenization of the exhaust gas into the intake air charge. Further, the disposition of EGR take-off and mixing points provides very effective cooling of the exhaust gas for increased available EGR mass and improved performance. In further embodiments, the engine system may further include a high pressure EGR flow path wherein exhaust gas is drawn from upstream of turbine 116 and recirculated to the engine intake manifold, downstream of compressor 114.

EGR cooler 51 may be coupled to EGR passage 50 for cooling EGR delivered to the compressor. In addition, one or more sensors may be coupled to EGR passage 50 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor 54 may be provided for estimating an air-fuel ratio of the EGR. An opening of the EGR valve may be adjusted based on the engine operating conditions and the EGR conditions to provide a desired amount of engine dilution.

In the depicted embodiment, EGR passage 50 merges with first and second compressor recirculation flow passages 60 and 70 at a junction of the first and second passages, upstream of the compressor inlet. Since EGR has relatively large water content, the LP-EGR provided to the intake at this pre-compressor location may be prone to condensation. In particular, based on EGR conditions, engine operating conditions, and a compressor inlet temperature at a time when the EGR is received, condensation can occur at both the compressor inlet as well as the charge air cooler outlet. For example, under cold ambient conditions, when the humid EGR is mixed with cold ambient intake air, water droplets can form. Water droplets impacting the compressor blades which are rotating at high speeds (e.g., 200,000 rpm or above) can cause damage to the blades. In addition, since the ingested water slows the rate of combustion, the introduction of water into the engine can increase the likelihood of misfire events. As elaborated herein with reference to FIGS. 3-4, a controller may adjust a compressor inlet temperature to reduce the likelihood of condensation. For example, the compressor inlet temperature may be maintained above a threshold temperature that is based on EGR and condensation considerations. The controller may proportion an amount of pre-cooler and post-cooler compressed air recirculated to the compressor inlet based on the compressor inlet temperature and further based on the EGR received from the EGR passage. For example, when the ambient humidity and/or the EGR water content is higher, or when ambient temperatures are cooler, the controller may adjust the valves to recirculate a larger portion of warmer pre-cooler compressed air to the compressor to reduce condensation. In another example, when the ambient humidity and/or the EGR water content is lower, or when ambient temperatures are warmer, the controller may adjust the valves to recirculate a larger portion of colder post-cooler compressed air to the compressor inlet. The compressor recirculation flow is then mixed with the EGR before delivering the mixture to the compressor inlet. This allows a desired engine dilution to be achieved with reduced propensity for condensation, and related issues.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and EGR sensor 54. Other sensors such as additional pressure, temperature, air/fuel ratio, and composition sensors may be coupled to various locations in engine system 100. The actuators 81 may include, for example, throttle 20, EGR valve 52, compressor recirculation valves 62, 72, 82, wastegate actuator 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described herein with regard to FIGS. 3-4.

It will be appreciated that while the embodiments of FIGS. 1-2 show two distinct compressor recirculation flow passages, in still other embodiments, only one flow passage may be provided. For example, as shown in embodiment 800 of FIG. 8, the engine system may be configured with a single compressor recirculation passage 60 including compressor recirculation valve 62 for recirculating cooled compressed air from downstream of charge air cooler 18 to the inlet of compressor 114. Therein, in response to an indication of surge, the controller may open (e.g., fully open) valve 62 to recirculate compressed air from downstream of the charge air cooler and upstream of the intake throttle to the compressor inlet. By addressing surge with only cooled compressed air, that is compressed aircharge that has been cooled upon passing through the charge air cooler, a temperature amplification effect of recirculation flow is reduced. In addition, by locating the compressor bypass system post the charge air cooler, and closer to the engine intake throttle, the natural momentum of the air flow can be advantageously used to force flow through the recirculation passage during a throttle closing event (e.g., a tip-out), thereby further improving mass flow through the compressor and the margin to surge. Further still, since the margin to surge initially follows a path of increased mass flow through the compressor instead of rapid pressure decay, if a tip-in is requested soon after (e.g., immediately after) the recirculation valve is opened, the higher boost pressure that is already available can be used to build torque to meet driver demand. As such, this approach improves overall torque response and driveability.

Now turning to FIG. 3, an example routine 300 is shown for adjusting a relative amount of compressed air recirculated to a compressor inlet from a first passage downstream of the compressor and downstream of an intercooler, and from a second passage downstream of the compressor and upstream of the intercooler based on compressor inlet temperature. By adjusting the relative amounts based on operating conditions, a temperature-controlled mixture may be provided to the compressor inlet.

At 302, the routine includes estimating and/or measuring engine operating conditions. The estimated conditions may include, for example, engine speed, driver torque demand, ambient conditions (e.g., ambient temperature and humidity, and barometric pressure), MAP, MAF, MAT, engine temperature, boost level, etc. At 304, based on the estimated operating conditions, a position of the compressor recirculation valve(s) may be determined. This may include determining the position of a first continuously variable valve in the first passage for recirculating post-cooler cooled compressed air-charge to the compressor inlet, as well as determining the position of a second continuously variable valve in the second passage for recirculating pre-cooler warm compressed air-charge to the compressor inlet. Alternatively, in configurations where a single valve controls flow through both the passages, a position of the single compressor recirculation valve may be determined. In one example, the valves may be maintained in a (default) partially open (e.g., semi-open) position while the engine is operating boosted so as to provide some margin to a surge limit. At 305, an amount of EGR required may be determined based on the estimated operating conditions. For example, an amount of engine dilution required may be determined, and the amount of EGR that provides the requested engine dilution is determined. A corresponding opening of the EGR valve may also be determined.

At 306, it may be determined if the compressor is at or near a surge limit. In one example, the compressor may be at or near the surge limit due to an operator pedal tip-out event. If there is no indication of surge, then at 316, a compressor inlet temperature may be measured or estimated and it may be determined if the temperature is below a threshold temperature. As discussed below, the controller may adjust one or more settings of the compressor recirculation valve(s) to maintain the compressor inlet temperature above the threshold temperature. The threshold temperature may correspond to a temperature below which condensation is likely to occur at the compressor. The threshold temperature above which the compressor inlet temperature is to be maintained may be based on ambient conditions such as ambient humidity and ambient temperature, as well as EGR rate. For example, the threshold temperature may be increased as the ambient humidity increases. As another example, the threshold temperature may be decreased as the ambient humidity increases.

The threshold temperature may be further based on the amount of EGR to be delivered to the engine intake. Herein, the EGR may be a low pressure EGR including exhaust residuals that are recirculated from downstream of an exhaust turbine to the compressor inlet. As an example, the threshold temperature may be increased as a water content in the EGR increases. As another example, the threshold temperature may be decreased as an amount of the EGR decreases.

If the compressor inlet temperature is at or above the threshold temperature (that is, the compressor inlet is sufficiently warm), then it may be determined that the likelihood of condensation forming at the compressor inlet during delivery of EGR is low. Accordingly, at 318, an opening of the EGR valve may be adjusted to deliver the desired amount of EGR to the compressor inlet, for subsequent delivery to the engine intake. Any compressor recirculation flow being provided at the time (such as due to one or more of the compressor recirculation valves being partially open) may be mixed with the EGR upstream of the compressor inlet before being delivered to the compressor.

If the compressor inlet temperature is below the threshold temperature (that is, the compressor inlet is cold), then it may be determined that the likelihood of condensation forming at the compressor inlet during delivery of the EGR is high. Accordingly, at 320, the routine includes adjusting a relative amount of compressed air recirculated to a compressor inlet from a first passage downstream of the compressor and downstream of an intercooler, and from a second passage downstream of the compressor and upstream of the intercooler based on compressor inlet temperature. In particular, the adjusting includes, increasing the amount of (warmer, pre-cooler) compressed air recirculated along the second passage while correspondingly decreasing the amount of (colder, post-cooler) compressed air recirculated along the first passage as the compressor inlet temperature falls below the threshold temperature. The adjusting may also be based on the EGR so as to increase the compressor inlet temperature above the threshold temperature, thereby reducing water condensing out of the delivered EGR. In particular, the adjusting may include increasing the amount of (warmer, pre-cooler) compressed air recirculated along the second passage while decreasing the amount of compressed air recirculated along the (colder, post-cooler) first passage as the water content in the EGR increases. Further, the controller may decrease the amount of compressed air recirculated along the second passage while increasing the amount of compressed air recirculated along the first passage as one or more of the EGR temperature increases and the EGR amount decreases.

The controller may adjust the opening of the first and second valves respectively coupled to the first and second passages to adjust the compressor recirculation flow. For example, at 322, decreasing the amount of compressed air recirculated along the first passage may include decreasing an opening of the first valve in the first passage, while increasing the amount of compressed air recirculated along the second passage may include increasing an opening of a second valve in the second passage. In one example, where the valves are at a default semi-open position during boosted engine operation, the adjusting at 322 may include reducing an opening of the first valve from the semi-open position towards (or to) a closed position, and increasing an opening of the second valve from the semi-open position towards (or to) a fully-open position. In alternate embodiments, where flow through both the passages is controlled via a single proportioning valve, adjusting the relative amount of flow through the passages includes adjusting the opening of the proportioning valve coupled at a junction of the first and second passages, upstream of the compressor inlet, to increase the proportion of warmer compressor recirculation flow and decrease the proportion of cooler compressor recirculation flow. The opening of the valves may be adjusted based on a difference between the estimated compressor inlet temperature and the threshold temperature with the opening of the second valve increased (and/or the opening of the first valve decreased) as the estimated compressor inlet temperature falls below the threshold temperature.

It will be appreciated that while the routine shows adjusting the relative proportion of compressed air recirculated via the first and second passages, in another example, when cooled EGR is received at the compressor inlet, the first valve in the first passage may be fully closed and the second valve in the second passage may be fully opened to only provide warmed compressor recirculation flow alongside the cooled EGR.

It will also be appreciated that while the routine shows adjusting the proportion to provide a desired compressor inlet temperature, in still further embodiments, the proportion of pre-cooler and post-cooler recirculation flow is adjusted based on differences between an estimated and an actual compressor deceleration profile, or based on a desired compressor mass flow.

At 324, the routine includes mixing the recirculation flow with the EGR received at the compressor inlet (from downstream of the exhaust turbine) before delivering the mixture to the compressor. In this way, a temperature-controlled mixture of recirculated compressed air and exhaust residuals may be provided to the engine for combustion to meet the desired dilution need without generating condensation to form at the compressor. By reducing condensation at the compressor inlet, compressor degradation arising from ingestion of water is reduced and boosted engine performance is improved.

Returning to 306, if an indication of surge is determined, then at 308, the routine includes adjusting a relative amount of compressed air recirculated to a compressor inlet from the first passage downstream of the compressor and downstream of the intercooler, and the second passage downstream of the compressor and upstream of the intercooler so as to increase recirculation of cooled compressed aircharge to the compressor inlet.

In one example, at 310, this includes, in response to the indication of compressor surge, recirculating compressed air from downstream of a charge air cooler and upstream of an intake throttle to a compressor inlet by increasing the opening of the first valve located in the first passage coupling the compressor inlet to the intercooler outlet. By recirculating cooled compressed aircharge to the compressor inlet, a thermal amplification effect of the recirculation is reduced. The position of the valve may be continuously variable from a fully open position to a fully closed position. As previously discussed, the first valve in the first passage may be partially open when the engine is operated with boost, and increasing the opening of the valve may include moving the first valve from the partially open position towards (or to) a fully open position. However, in an alternate example, the valve in the first passage may be maintained closed during peak performance conditions (when the engine is operated with boost) and increasing the opening of the valve may include moving the first valve from the fully closed position to a partially open or fully open position. The increasing may be based on one or more of a compressor flow rate, a compressor inlet temperature and the compressor surge limit. For example, the opening may be increased more as the compressor inlet temperature rises above a threshold temperature. Further, while increasing the opening of the first valve to increase cooled compressor recirculation flow, the controller may adjust the opening of the second valve based on the opening of the first valve to maintain the compressor inlet temperature above a threshold temperature (e.g., above a lower threshold temperature below which condensation can occur, but below an upper threshold temperature above which the thermal amplification effect becomes pronounced).

It will be appreciated that in response to the indication of surge, the controller may also adjust a wastegate coupled to the exhaust turbine driving the compressor.

Optionally, at 312, an EGR valve may be adjusted based on the compressor recirculation valve adjustment and the surge limit. For example, EGR may be decreased in response to the indication of surge. When EGR is provided, the recirculation flow may be mixed with the EGR upstream of the compressor before delivering the mixture to the compressor inlet.

In this way, by recirculating cooler boosted air from downstream of the charge air cooler to the compressor inlet when at or near a surge limit, a temperature amplification effect is reduced. In addition, by locating the compressor bypass system post the charge air cooler, and closer to the engine intake throttle, the natural momentum of the air flow can be advantageously used to force flow through the recirculation passage during a throttle closing event (e.g., a tip-out), thereby further improving mass flow through the compressor and the margin to surge. Further still, since the margin to surge initially follows a path of increased mass flow through the compressor instead of rapid pressure decay, if a tip-in is requested soon after (e.g., immediately after) the recirculation valve is opened, the higher boost pressure that is already available can be used to build torque to meet driver demand, improving overall torque response and driveability.

While the routine of FIG. 3 depicts increasing recirculation of cooled compressed air from downstream of the charge air cooler to the compressor inlet in response to the indication of surge, it will be appreciated that in other embodiments, such as elaborated at FIG. 4, the controller may select between increasing compressor recirculation flow to the compressor inlet from downstream of the charge air cooler or upstream of the charge air cooler based on condensation considerations (such as based on whether condensation is possible from EGR being concurrently delivered and/or ambient humidity). Therein, during a first surge condition, the controller may address the surge by increasing the opening of the second valve (which maintaining or reducing the opening of the first valve) to provide increased recirculation of warm compressed air to the compressor inlet. In comparison, during a second surge condition, the controller may address the surge by increasing the opening of the first valve (which maintaining or reducing the opening of the second valve) to provide increased recirculation of cooled compressed air to the compressor inlet.

This difference is illustrated with reference to compressor map 700 of FIG. 7. Map 700 shows a change in compressor pressure ratio (along the y-axis) at different compressor flow rates (along the x-axis). Line 702 shows a surge limit (herein, a hard surge limit) for the given operating conditions. Compressor operation to the left of hard surge limit 702 results in operation in a hard surge region 704 (depicted as shaded region 704). Compressor operation in hard surge region 704 results in objectionable NVH and potential degradation of engine performance. By opening a compressor recirculation valve, compressor operation may be moved to the right of the hard surge limit. Plot 706 depicts a change in compressor ratio achieved by opening the first valve in the first passage to increase recirculation of cooled (post-cooler) compressed air, while plot 708 depicts a change in compressor ratio achieved by opening the second valve in the second passage to increase recirculation of warm (pre-cooler) compressed air. As can be seen comparing plots 706 and 708, by opening the first valve to increase recirculation flow via the first passage, more mass flow is pushed through the compressor while moving the compressor operation further from (to the right of) the surge limit. However, as elaborated with reference to FIG. 4, when the likelihood of condensation at the compressor is high, increased recirculation of cooled compressed air may not be desired since the disadvantages from increased condensation ingestion at the compressor may outweigh the benefits from the improved surge margin. During those conditions, increased recirculation of warm pre-cooler compressor recirculation flow may be advantageously used for both addressing surge and compressor inlet condensation. In still further conditions, recirculation of warm pre-cooler compressor recirculation flow and cold post-cooler compressor recirculation flow may be combined to provide a temperature-controlled recirculation flow that addresses surge.

In one example, in response to an indication of compressor surge, an engine controller may adjust a relative amount of compressed air recirculated to a compressor inlet from a first passage downstream of the compressor and downstream of an intercooler, and a second passage downstream of the compressor and upstream of the intercooler. Herein, the indication of compressor surge is based on an operator pedal tip-out. As such, surge can occur whenever the primary throttle angle is reduced. While this example discusses operator tip-out, in other examples, the indication of surge may occur due to (or during a) transmission shift event, a traction control event, etc. The adjusting may include, as an intake throttle is closed, adjusting the relative amount based on a difference between an estimated compressor inlet temperature and a desired compressor inlet temperature. This may be achieved by increasing the opening of a continuously variable valve coupled to each of the first and second passages to increase compressor air recirculation along the first passage and decrease compressor air recirculation along the second passage.

Alternatively, in embodiments having dedicated valves in each passage, during a first condition, the controller may increase the opening of a first valve in the first passage to increase an amount of compressed air recirculated from the first passage while decreasing the opening of a second valve in the second passage to decrease the amount of compressed air recirculated from the second passage. Then, during a second condition, the controller may decrease the opening of the first valve in the first passage to decrease the amount of compressed air recirculated from the first passage while increasing the opening of the second valve in the second passage to increase the amount of compressed air recirculated from the second passage. Herein, during the first condition, a likelihood of compressor inlet condensation is lower, and during the second condition, a likelihood of compressor inlet condensation is higher. During both conditions, the controller may also adjust an amount of exhaust gas recirculated from downstream of an exhaust turbine to the compressor inlet based on the adjusted relative amount of compressed air recirculation to relieve the surge condition.

Now turning to FIG. 4, an example routine 400 is shown for addressing compressor surge by increasing recirculation of compressed air from downstream of the compressor to the compressor inlet, and selecting between increasing recirculation to the compressor inlet from upstream of a charge air cooler or downstream of the charge air cooler based on condensation considerations. In this way, the method enables surge to be addressed without increasing the risk of compressor inlet condensation.

At 402, an operator pedal tip-out may be confirmed. For example, it may be confirmed that the vehicle operator has released the accelerator pedal. Upon confirmation, at 403, an intake throttle opening may be decreased responsive to the tip-out. For example, the throttle may be closed. At 404, it may be determined if there is an indication of surge. In particular, as the throttle is closed, flow through the compressor may decrease, leading to compressor surge. Compressor surge can lead to NVH issues such as undesirable noise from the engine intake system. As such, the indication of surge may be based on the tip-out and may be determined based on a compressor flow rate at the time of the tip-out relative to a surge limit of the compressor.

If the compressor flow is not at or near the surge limit at 404, then at 406, an indication of surge is not confirmed and the routine proceeds to reduce boost pressure, for example, by opening a wastegate to reduce turbine speed. In addition, a position of a first continuously variable compressor recirculation valve coupled to a first compressor recirculation passage (from the charge air cooler outlet to the compressor inlet) and the position of a second continuously variable compressor recirculation valve coupled to a second compressor recirculation passage (from the compressor outlet, upstream of the charge air cooler outlet to the compressor inlet) may be adjusted based on the reduced boost pressure. For example, one or both the valves may be maintained in a partially open (e.g., semi-open) position when the engine is operated with boost (to provide some margin to surge) and in response to the boost pressure being decreased and the intake throttle being closed, the opening of the valves may be decreased (e.g., the valves may be closed).

If the compressor ratio is at or near the surge limit at 404, then at 408, the routine includes determining an amount of compressor recirculation flow required to address the surge. As such, the amount of compressed air recirculated from downstream of the compressor to the compressor inlet may be based on a compressor flow at the time of tip-out relative to a surge limit, with the amount increased as the compressor flow moves further into (e.g., to the left of) the surge limit on a compressor map. This may include determining an amount of recirculation flow desired from each of the first and second passages to address the surge, and a corresponding valve opening amount. In one example, surge may be addressed by increasing cold recirculation flow (or cooled boosted aircharge) along the first passage by opening the first valve only. In another example, surge may be addressed by increasing hot recirculation flow (or warmed boosted aircharge) by opening the second valve only. In still another example, surge may be addressed by adjusting a relative amount of hot and cold recirculation flow from each of the first and second passages. At 410, the routine estimates a change in compressor inlet temperature associated with each of the options determined at 408. For example, an increase in compressor inlet temperature that may be incurred if the first valve is opened is estimated and compared to a decrease in compressor inlet temperature that may be incurred if the second valve is opened.

At 412, a likelihood of condensation is determined. The likelihood of condensation may be based on each of a compressor inlet temperature, ambient humidity, and ambient temperature, and further based on EGR recirculated to the compressor inlet (from downstream of the turbine) via an EGR passage. For example, it may be determined if there is any low pressure EGR being received at the compressor inlet, and if so, a temperature and humidity of the EGR is determined. Further, a temperature and humidity of ambient air received at the compressor inlet is also determined. Based on the temperature and humidity of the intake air and the EGR, a likelihood of condensation is determined and further it is determined if the change in compressor inlet temperature is likely to precipitate the condensation or reduce the condensation. For example, if the likelihood of condensation is high, the addition of cold recirculation flow may precipitate the condensation and thus may be undesirable. Under those conditions, warm recirculation flow may be used to reduce surge and reduce the likelihood of condensation. Thus, at 412, while closing the intake throttle in response to the tip-out, the controller may increase recirculation of compressed air from downstream of the compressor to the compressor inlet, and may select between increasing recirculation via the first passage or the second passage based on condensation.

In particular, at 414, when the likelihood of condensation is lower (e.g., no likelihood of condensation), the routine includes increasing recirculation flow via the first passage. As such, this leads to an increased recirculation of cooled compressed air to the compressor inlet. By increasing the amount of cooled recirculation flow delivered to the compressor inlet in response to the indication of surge, a temperature amplification effect of recirculation flow is reduced In addition, by recirculating compressed air from post the charge air cooler, and closer to the engine intake throttle, the natural momentum of the air flow can be advantageously used to force flow through the recirculation passage during the throttle closing event (herein the tip-out), thereby further improving mass flow through the compressor and the margin to surge. Further still, since the margin to surge initially follows a path of increased mass flow through the compressor instead of rapid pressure decay, if a tip-in is requested soon after (e.g., immediately after) the recirculation valve is opened, the higher boost pressure that is already available can be used to build torque to meet driver demand. This allows boost pressure to be rapidly provided if there is a tip-in soon after the tip-out.

In comparison, at 416, when the likelihood of condensation is higher, the routine includes increasing recirculation flow via the second passage. As such, this leads to an increased recirculation of warm compressed air to the compressor inlet. By increasing the amount of warmed recirculation flow delivered to the compressor inlet in response to the indication of surge, boost pressure can be rapidly reduced to increase flow through the compressor, while the increased temperature of the recirculation flow can reduce the possibility of condensation forming at the compressor inlet.

As such, in addition to increasing recirculation of compressed air from downstream of the compressor (pre- and/or post cooler) to the compressor inlet, at 414 and 416, the routine may increase an opening of a wastegate coupled across the exhaust turbine in response to the tip-out. The opening of the wastegate may be based on the recirculation of compressed air from downstream of the cooler to the compressor inlet. For example, the amount of wastegate opening required when recirculating cooled compressed air along the first passage (at 414) may be different from the amount of wastegate opening required when recirculating warm compressed air along the second passage (at 416). In one example, due to the temperature amplification effect incurred with warmer compressor recirculation flow, a smaller wastegate opening may be used alongside the opening of the second valve in the second passage while a larger wastegate opening may be used alongside the opening of the first valve in the first passage for boost control.

Now turning to FIG. 9, an example routine 900 is shown for addressing compressor surge by increasing recirculation of compressed air from downstream of a charge air cooler and upstream of an intake throttle to the compressor inlet. In one example, the routine of FIG. 9 may be used with the embodiment of engine system depicted at FIG. 8. Herein, surge may be addressed using cooled compressor recirculation flow to improve the surge margin.

At 902, as at 302, engine operating conditions may be measured and/or estimated. At 904, as at 304, based on the estimated operating conditions, the position of a compressor recirculation valve coupled in a passage from downstream of a charge air cooler to upstream of a compressor passage may be determined. In one example, where the compressor recirculation valve is an on/off valve or a continuously variable valve, the valve may be maintained closed. In another example, where the valve is a continuously variable valve, the valve may be held partially open to provide at least some margin to surge. Alternatively, the continuously variable valve may be held closed during peak performance conditions, when the engine is operating with boost, to improve boost capability and peak performance.

At 906, as at 306, it may be determined if an indication of surge has been received. For example, it may be determined if the compressor operation (e.g., compressor ratio or flow) is at or beyond a surge limit. In one example, the controller may use a compressor map such as the map of FIG. 7 to identify surge conditions.

If surge is confirmed, then at 908, in response to the indication of surge, the controller may open (e.g. fully open) the compressor recirculation valve (CRV) to recirculate (or increase recirculation of) cooled compressed aircharge form downstream of the charge air cooler to the compressor inlet. By addressing surge with only cooled compressed air, a temperature amplification effect of recirculation flow is reduced, and mass flow through the compressor stays sufficiently high to avoid compressor surge. In addition, by using a compressor bypass system post the charge air cooler, and closer to the engine intake throttle, the natural momentum of the air flow can be advantageously used to force flow through the recirculation passage during a throttle closing event (e.g., a tip-out), thereby further improving mass flow through the compressor and the margin to surge.

At 910, optionally, an EGR valve may be adjusted based on the indication of surge and the adjustment of the CRV. For example, EGR valve opening may be increased or decreased. If EGR is provided, the recirculation flow from the recirculation passage may be mixed with the EGR upstream of the compressor inlet before the mixed aircharge is delivered to the compressor.

Returning to 906, if an indication of surge is not confirmed, then at 912, the routine includes maintaining the position of the CRV, as determined at 904. At 914, a position of the EGR valve may be adjusted based on the engine operating conditions to provide a desired amount of engine dilution. If EGR is requested, any recirculation flow from the recirculation passage may be mixed with the EGR upstream of the compressor inlet before the mixed aircharge is delivered to the compressor.

In this way, a continuously variable compressor recirculation valve on a recirculation path that draws air from location downstream of a charge air cooler can be used to address surge. Drawing from this location allows the valve to flow air continuously without increasing compressor outlet temperatures above the limit for oil coking and component protection (typically 160-180° C.).

Figure 5:
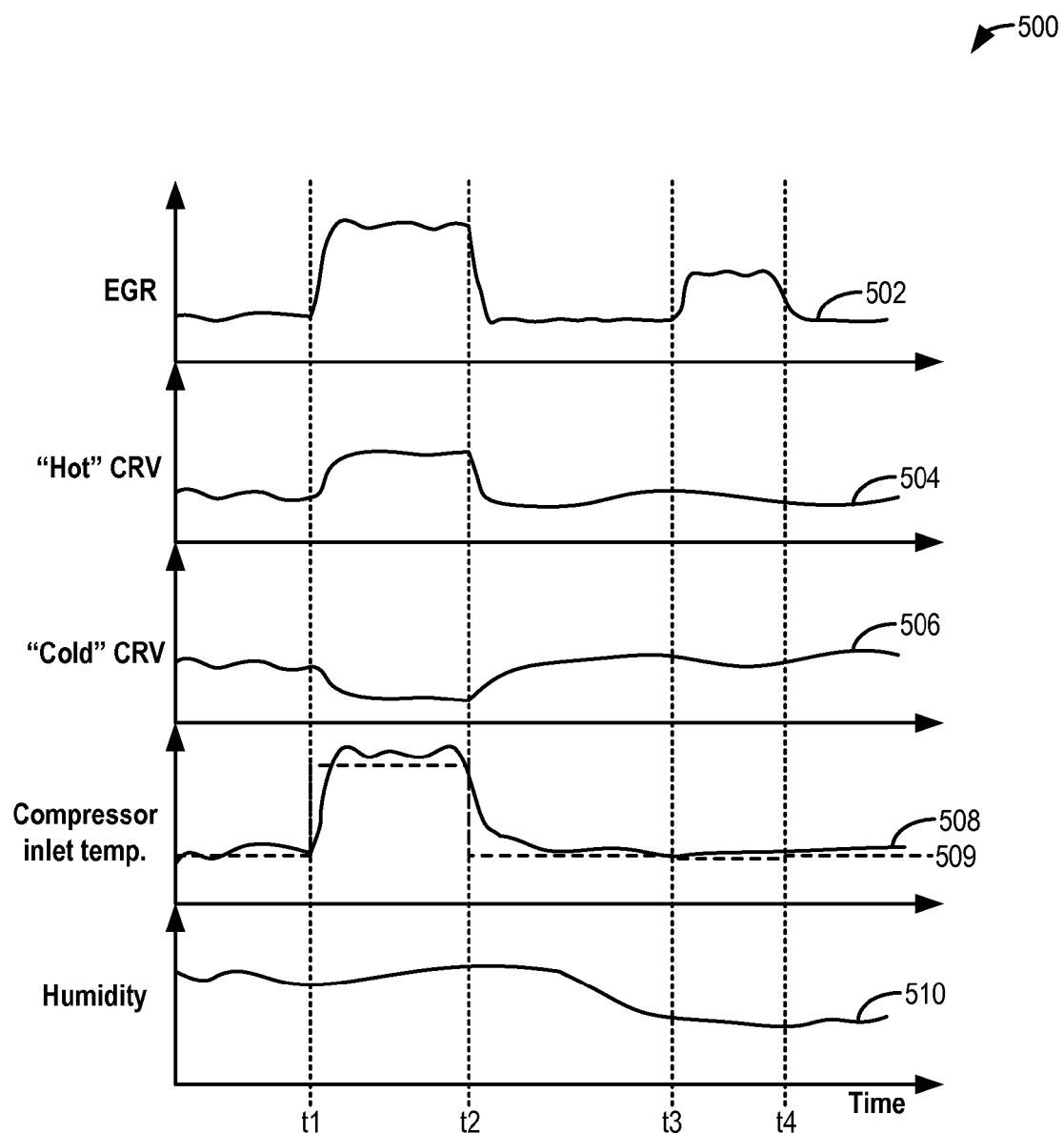
FIG. 5 shows example compressor recirculation flow adjustments that may be used for reducing EGR condensation at the compressor inlet.

Now turning to FIG. 5, map 500 depicts an example compressor recirculation valve adjustment that may be used to provide a temperature-controlled mixture to a compressor inlet. The adjustment reduces condensation from EGR also received at the compressor inlet.

Map 500 depicts low pressure EGR received at a compressor inlet at plot 502, changes to the position of the second compressor recirculation valve configured to recirculate warm pre-cooler compressed aircharge to the compressor inlet via the second passage (herein also referred to as the hot CRV) at plot 504, changes to the position of the first compressor recirculation valve configured to recirculate cold post-cooler compressed aircharge to the compressor inlet via the first passage (herein also referred to as the cold CRV) at plot 506, a compressor inlet temperature at plot 508, and ambient humidity at plot 510. All plots are shown over time of engine operation, along the x-axis.

Prior to t1, the engine may be operating boosted with each of the hot and cold valves adjusted to a position that allows a compressor inlet temperature to be at or around desired temperature 509 (dashed line). For example, each of the hot and cold recirculation valves may be partially open (plots 504-506). In addition, a smaller amount of EGR may be delivered to the engine intake prior to t1. The ambient humidity (plot 510) may be relatively high. At t1, due to a change in engine operating conditions, and the need for more engine dilution, the EGR valve may be opened to provide more EGR (plot 502). As such, at t1, when EGR (which itself has a water content) is received, at the relatively high ambient humidity, the likelihood of condensation may be higher. Thus, at t1, the desired temperature 509 is raised. Also at t1, a relative amount of compressor recirculation flow delivered via the hot and cold valves is adjusted to maintain the compressor inlet temperature at the adjusted desired temperature (or within a range where component degradation is not a concern) while the requested EGR is provided. As shown, between t1 and t2, while increased EGR is provided, the opening of the hot CRV is increased while the opening of the cold CRV is decreased to increase the proportion of warmed pre-cooler recirculation flow delivered to the compressor inlet. The warmer recirculation flow is then mixed with the EGR upstream of the compressor before the mixture is delivered to the compressor inlet. In doing so, the compressor inlet is warmed and the likelihood of condensation from the EGR being ingested into the compressor is reduced.

At t2, the amount of EGR required decreases and correspondingly the EGR valve opening is reduced. Further, the desired temperature for the compressor inlet is returned to the original, lower value. Also at t2, the hot and cold compressor recirculation flow valves are returned to their initial (e.g., default, semi-open) positions, or to an alternate nominal position that enables the compressor inlet temperature to be maintained at the resumed threshold temperature.

Between t2 and t3, due to a change in ambient conditions, the ambient humidity may drop. At t3, due to a change in engine operating conditions, and the need for more engine dilution, an EGR request may be received and the EGR valve may be opened again to provide more EGR. In this example, the amount of EGR requested at t3 may be smaller than the amount requested at t1. In alternate examples, the amount of EGR requested at t3 may be larger when the ambient humidity is lower. At t3, when the EGR request is received, the ambient humidity (plot 510) may be lower. Due to the lower ambient humidity and the smaller EGR request, the likelihood of condensation may be lower. Thus, at t3, the threshold temperature 509 may not need to be raised. Thus at t3, a relative amount of compressor recirculation flow delivered via the hot and cold valves is maintained to maintain the compressor inlet temperature at the unadjusted desired temperature while the requested EGR is provided. As shown, between t3 and t4, while increased EGR is provided, the opening of the hot CRV and the opening of the cold CRV is maintained. The recirculation flow is then mixed with the EGR upstream of the compressor before the mixture is delivered to the compressor inlet and the likelihood of condensation from the EGR being ingested into the compressor is reduced.

In this way, an engine controller may adjust a proportion of compressor recirculation flow received at a compressor inlet from a first location downstream of an intercooler and a second location upstream of the intercooler. EGR received at the compressor inlet from downstream of an exhaust turbine is mixed with the recirculation flow before delivering the mixture to the compressor. Herein, the compressor recirculation flow from the second location is at a higher temperature than the compressor recirculation flow from the first location, and the adjusting is based on a temperature difference between the compressor recirculation flow from the first location and the second location. The adjusting is further based on one or more of a compressor inlet temperature, an EGR temperature, an EGR amount, an EGR humidity, an ambient humidity, and an intake air temperature, with the proportion of compressor flow from the first location relative to the second location adjusted to raise a compressor inlet temperature above a desired temperature. The desired temperature is also based on one or more of the EGR humidity, the ambient humidity, and the intake air temperature, the threshold temperature raised as the EGR humidity or the ambient humidity increases or as the intake air temperature decreases. In one example, adjusting the proportion of hot and cold compressor recirculation flow includes increasing the proportion of recirculation flow from the second location while correspondingly decreasing the proportion of recirculation flow from the first location as the compressor inlet temperature or the EGR temperature decreases. As another example, the adjusting includes increasing the proportion of recirculation flow from the second location while decreasing the proportion of recirculation flow from the first location as the EGR humidity or the ambient humidity increases, as the EGR amount increases, and/or as the intake air temperature decreases. In this way, by adjusting the proportion of hot and cold compressor recirculation flow delivered to a compressor inlet, a temperature-controlled mixture can be provided to the compressor inlet to reduce the likelihood of condensation at that location, and to further reduce ingestion of water at the compressor. This in turn may reduce the occurrence of misfires and other condensation related issues.

Figure 6:
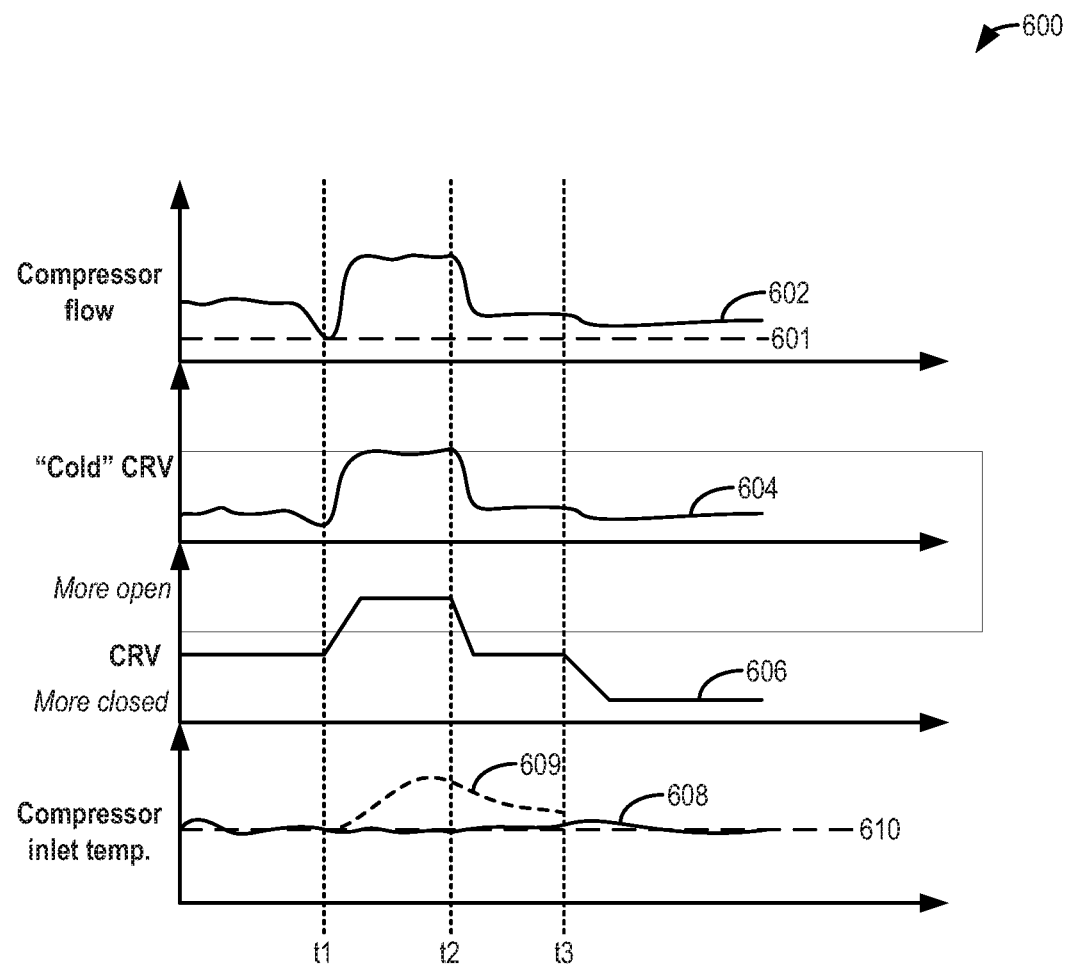
FIG. 6 shows example compressor recirculation flow adjustments that may be used in response to an indication of surge.

Now turning to FIG. 6, map 600 depicts an example compressor recirculation valve adjustment that may be used to address compressor surge. Map 600 depicts compressor flow at plot 602, changes to the position of a single compressor recirculation valve configured to adjust the proportion of compressed aircharge recirculated to the compressor inlet from a location pre-cooler and post-cooler at plot 606, a corresponding change to the amount of cold compressor recirculation flow at plot 604, and compressor inlet temperature at plot 608. All plots are shown over time of engine operation, along the x-axis.

Prior to t1, the engine may be operating boosted with the CRV at a default, semi-open position (plot 606). At this position, the compressor inlet temperature is maintained at or around a desired temperature 610 (dashed line). In addition, the compressor may be operating with a compressor flow, 602, that is away from a surge limit 601. At t1, a tip-out may occur. In response to the tip-out, a throttle opening may be decreased (e.g., the throttle may be closed) and a wastegate may be opened. However, due to the throttle closure, the flow through the compressor may decrease causing the compressor to move to, or beyond, the surge limit 601.

In response to the indication of surge (or in anticipation of surge), the CRV opening is increased, for example, from the partially-open position prior to t1 to a fully open position after t1. The valve may be opened so as to increase an amount of (cooled) compressed aircharge recirculated to the compressor inlet from downstream of a charge air cooler. Optionally, the valve may be adjusted to also correspondingly decrease an amount of (warmed) compressed aircharge recirculated to the compressor inlet from upstream of the charge air cooler. By opening the valve to increase the proportion of cooled air recirculated to the compressor inlet, a compressor inlet temperature may be reduced to desired value 610, reducing the risk of thermal amplification during the recirculation. Thus, even if some re-boosting of the recirculation flow occurs (as the flow passes through the compressor again), there would be a smaller increase in compressor temperature. As a result of the increased recirculation of cooled compressed aircharge to the compressor inlet between t1 and t2, the compressor is moved further away from surge limit 601. As such, if the proportion of recirculated cooled compressed air were not increased, during the initial phase of a tip-out, some re-boosting of the recirculation flow could occur which would amplify the compressor temperature (see segment 609, dashed line).

At t2, once the indication of compressor surge has reduced, the opening of the compressor recirculation valve is readjusted and the valve is returned to the default semi-open position. At t3, due to a change in engine operating conditions, boosted engine operation may be discontinued and the valve position may be further adjusted. Specifically, the valve opening may be decreased and the valve may be shifted from the semi-open position to a fully closed position.

In one example, an engine system comprises an engine including an intake and an exhaust, a compressor for compressing intake air, the compressor driven by an exhaust turbine, an intercooler located downstream of the compressor for cooling the compressed intake air, a first passage for recirculating compressed intake air from downstream of the intercooler to a compressor inlet, a second passage for recirculating compressed intake air from upstream of the intercooler to the compressor inlet, and an EGR passage for recirculating exhaust gas from downstream of the turbine to upstream of the compressor. A controller with computer readable instructions may be configured to, during a first condition, adjust a ratio of compressed air recirculated along the first passage relative to the second passage in a first direction responsive to EGR condensation; and during a second condition, adjust the ratio in a second, opposite direction responsive to compressor surge. Herein, during the first condition, the adjusting includes increasing the ratio of compressed air recirculated along the second passage while decreasing the ratio of compressed air recirculated along the first passage, the increasing and decreasing during the first condition based on one or more of (e.g., each of) an amount, a temperature, and a water content of the EGR. In comparison, during the second condition, the adjusting includes increasing the ratio of compressed air recirculated along the first passage while decreasing the ratio of compressed air recirculated along the second passage, the increasing and decreasing during the second condition based on a compressor flow relative to a surge limit. The system may include a first continuously variable valve coupled to the first passage, and a second continuously variable valve coupled to the second passage, wherein adjusting during the first condition includes increasing an opening of the second valve and wherein the adjusting during the second condition includes increasing an opening of the first valve.

In this way, compressor recirculation flow can be used to address surge and condensation at the compressor. By varying the proportion of compressed air recirculated to a compressor inlet from downstream of a compressor from a location upstream of a charge air cooler and a location downstream of the charge air cooler, a temperature controlled compressor recirculation flow can be provided to the compressor inlet. By enabling compressor inlet temperature control, various advantages are achieved. By increasing the proportion of warm recirculation flow (and decreasing the proportion of cold recirculation flow) during conditions condensation can occur at the inlet, such as when low-pressure EGR is received, the propensity for condensation is reduced. By reducing condensation, combustion issues related to the ingestion of condensation, such as misfires, may be reduced. In addition, hardware damage to the compressor is reduced. By increasing the proportion of cold recirculation flow (and decreasing the proportion of warm recirculation flow) during compressor surge conditions thermal amplification of the recirculated flow is reduced. By adjusting the proportion during surge conditions based on condensation, each of surge and condensation can be concurrently addressed. Overall, boosted engine performance is improved and compressor life is increased.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a boosted engine, comprising:
    determining, via an electronic control unit, engine operating conditions; and
    adjusting, via at least one valve, a relative amount of compressed air recirculated to a compressor inlet from a first passage downstream of a compressor and downstream of an intercooler, and from a second passage downstream of the compressor and upstream of the intercooler based on an estimated compressor inlet temperature and an EGR amount received via an EGR passage merging with the first and second passages;
        wherein the EGR amount includes exhaust residuals recirculated from downstream of an exhaust turbine to the compressor inlet via the EGR passage, the EGR passage merging with the first and second passages at a junction of the first and the second passage, upstream of the compressor inlet.

2. The method of claim 1,
    wherein the adjusting includes adjusting the relative amount of the compressed air recirculated to the compressor inlet to maintain the compressor inlet temperature above a threshold temperature, and
    wherein the compressed air recirculated to the compressor inlet from the first passage includes cooled compressed air cooled upon passing through the intercooler, and
    wherein the compressed air recirculated to the compressor inlet from the second passage includes warm compressed air not cooled upon passing through the intercooler.

3. The method of claim 2, wherein the threshold temperature is based on ambient conditions including ambient temperature and ambient humidity.

4. The method of claim 3, wherein the threshold temperature is increased as the ambient humidity increases, and wherein the threshold temperature is decreased as the ambient temperature increases.

5. The method of claim 4, wherein the threshold temperature is further based on the EGR amount, the threshold temperature increased as a water content in the EGR amount increases, the threshold temperature decreased as the ambient temperature increases or the amount of the EGR delivered via an EGR valve in the EGR passage decreases.

6. The method of claim 5, wherein the adjusting includes, increasing the relative amount of compressed air recirculated along the second passage while correspondingly decreasing the relative amount of compressed air recirculated along the first passage as the compressor inlet temperature falls below the threshold temperature.

7. The method of claim 6, wherein the EGR amount is in a low pressure EGR passage including the exhaust residuals recirculated from downstream of the exhaust turbine to upstream of the compressor.

8. The method of claim 7, wherein the adjusting, via the at least one valve, based on the EGR amount includes increasing the relative amount of compressed air recirculated along the second passage while decreasing the relative amount of compressed air recirculated along the first passage as the water content in the EGR amount increases.

9. The method of claim 8, wherein decreasing the relative amount of compressed air recirculated along the first passage includes decreasing an opening of a first valve in the first passage, and wherein increasing the relative amount of compressed air recirculated along the second passage includes increasing an opening of a second valve in the second passage.

10. The method of claim 7, wherein the adjusting, via the at least one valve, based on the EGR amount includes decreasing the relative amount of compressed air recirculated along the second passage while increasing the relative amount of compressed air recirculated along the first passage as one or more of an EGR temperature increases and the EGR amount decreases.

11. The method of claim 1, wherein adjusting the relative amount via the at least one valve includes adjusting an opening of a proportioning valve coupled at a junction of the first and second passages, upstream of the compressor inlet.

12. A method of controlling a turbocharged engine, comprising:
determining, via an electronic control unit, engine operating conditions;
adjusting, via at least one valve, a proportion of compressor recirculation flow received at a compressor inlet from a first location downstream of an intercooler and a second location upstream of the intercooler; and
mixing the compressor recirculation flow with an EGR flow, received at the compressor inlet from downstream of an exhaust turbine via an EGR passage, upstream of the compressor inlet before delivering the mixture to the compressor inlet.

13. The method of claim 12,
wherein the compressor recirculation flow from the second location is at a higher temperature than the compressor recirculation flow from the first location, and
wherein the adjusting, via the at least one valve, the proportion of compressor recirculation flow, based on the engine operating conditions includes adjusting based on a temperature difference between the compressor recirculation flow from the first location and the second location.

14. The method of claim 13, wherein the adjusting is further based on each of a compressor inlet temperature, an EGR temperature, an EGR amount, an EGR humidity, an ambient humidity, and an intake air temperature.

15. The method of claim 14, wherein the adjusting includes adjusting the proportion of compressor flow from the first location relative to the second location to raise the compressor inlet temperature above a threshold temperature, the threshold temperature based on each of the EGR humidity, the ambient humidity, and the intake air temperature, the threshold temperature raised as the EGR humidity or the ambient humidity increases or as the intake air temperature or ambient pressure decreases.

16. The method of claim 14, wherein the adjusting includes:
increasing, via the at least one valve, the proportion of recirculation flow from the second location while correspondingly decreasing the proportion of recirculation flow from the first location as the compressor inlet temperature or the EGR temperature decreases; and
increasing, via the at least one valve, the proportion of recirculation flow from the second location while decreasing the proportion of recirculation flow from the first location as the EGR humidity or the ambient humidity increases, as the EGR amount increases, and/or as the intake air temperature decreases.

17. An engine system, comprising:
an engine including an intake and an exhaust;
a compressor for compressing intake air, the compressor driven by an exhaust turbine;
an intercooler located downstream of the compressor for cooling the compressed intake air;
a first passage for recirculating compressed intake air from downstream of the intercooler to a compressor inlet;
a second passage for recirculating compressed intake air from upstream of the intercooler to the compressor inlet;
one or more valves coupled to the first and second passages;
an EGR passage for recirculating exhaust gas flow from downstream of the turbine to upstream of the compressor; and
a controller with computer readable instructions stored in a non-transitory medium for:
during a first condition, adjusting the one or more valves coupled to the first and second passages to decrease a ratio of compressed air recirculated along the first passage relative to the second passage in a first direction responsive to EGR condensation; and
during a second condition, adjusting the one or more valves coupled to the first and second passages to increase the ratio of compressed air recirculated along the first passage relative to the second passage in a second, opposite direction responsive to compressor surge.

18. The system of claim 17,
wherein during the first condition, a decrease in the ratio is based on each of an estimated amount, a sensed temperature, and a sensed water content in the EGR flow, and
wherein during the second condition, an increase in the ratio is based on a mapped compressor ratio relative to a surge limit.

19. The system of claim 17, further comprising a first continuously variable valve coupled to the first passage, and a second continuously variable valve coupled to the second passage, wherein the adjusting during the first condition includes increasing an opening of the second valve and wherein the adjusting during the second condition includes increasing an opening of the first valve.

* * * * *